United States Patent [19]

Wu et al.

[11] Patent Number: 5,973,589
[45] Date of Patent: Oct. 26, 1999

[54] ZNO VARISTOR OF LOW-TEMPERATURE SINTERING ABILITY

[75] Inventors: Tai-Bor Wu; Jyh-Kuang Tsai, both of Hsinchu, Taiwan

[73] Assignee: National Science Council, Taipei, Taiwan

[21] Appl. No.: 09/102,553

[22] Filed: Jun. 23, 1998

[30] Foreign Application Priority Data

Jun. 23, 1997 [CN] China ................................ 86108767

[51] Int. Cl.$^6$ ........................................... H01C 7/10
[52] U.S. Cl. ................................ 338/21; 338/20; 338/13
[58] Field of Search .............................. 338/21, 20, 13, 338/8, 223; 257/43

[56] References Cited

U.S. PATENT DOCUMENTS

| | | | |
|---|---|---|---|
| 4,097,834 | 6/1978 | Mar et al. ................................ | 338/21 |
| 4,290,041 | 9/1981 | Utsumi et al. . | |
| 4,559,167 | 12/1985 | Julke et al. .......................... | 252/518 |
| 5,119,062 | 6/1992 | Nakamura et al. ...................... | 338/20 |
| 5,369,390 | 11/1994 | Lin et al. ................................ | 338/21 |

FOREIGN PATENT DOCUMENTS

| | | |
|---|---|---|
| 719602 | 1/1979 | Germany . |
| 50-92488 | 7/1975 | Japan . |
| 51-43191 | 11/1976 | Japan . |
| 52-26491 | 2/1977 | Japan . |
| 4-369803 | 6/1991 | Japan . |

OTHER PUBLICATIONS (Jyh–Kuang Tsai et al., "Non–ohmic Characteristic of ZnO–V2O5 Ceramics", J. Appl. Phys. 76 (8), p. 4822, Oct. 1994.

Jyh–Kuang Tsai et al., "Non–ohmic Characteristic of $ZnO-V_2O_5$ Ceramics", J. Appl. Phys. 76 (8), pp. 4817–4822, no date.

Jyh–Kuang Tsai et al., "Microstructure and Nonohmic Properties of $ZnO-V_2O_5$ Ceramics", J. Appl. Phys., vol. 34, pp. 6452–6456, no date.

Jyh–Kuang Tsai et al., "Microstructure and Nonohmic Properties of Binary $ZnO-V_2O_5$ Ceramics Sintered at 900 ° C.C", Material Letters 26, pp. 199–203, no date.

*Primary Examiner*—Michael L. Gellner
*Assistant Examiner*—Richard K. Lee
*Attorney, Agent, or Firm*—Finnegan, Henderson, Farabow, Garrett & Dunner, L.L.P.

[57] ABSTRACT

Zinc oxide (ZnO) varistors containing vanadium oxide as the principal additive and one or more cobalt oxides and/or manganese oxides additives exhibit excellent nonlinear current-voltage characteristics. Preferably the varistor compositions are capable of being sintered at a temperature of from 900° C. to 950° C. The low-firing capability of the newly developed materials is attractive for the application in the multilayer chip varistor, because it can cofire with the silver (Ag) or palladium/silver (Pd/Ag) internal electrode instead of using the expensive palladium (Pd) or platinum (Pt) metal. With an appropriate combination of ZnO, vanadium oxide ($V_2O_5$) and other oxide additives, a varistor sintered at 900° C. for 2 hours is obtained with a nonlinear coefficient>50 and a leakage current<20 $\mu A/cm^2$.

28 Claims, No Drawings

ZNO VARISTOR OF LOW-TEMPERATURE SINTERING ABILITY

BACKGROUND OF THE INVENTION

1. Field of the Invention

The present invention relates to a zinc oxide (ZnO)—vanadium oxide varistors comprising a blend of metal oxide additives and having improved nonlinear current-voltage characteristics, more particularly to a ZnO—vanadium oxide varistor able to be sintered at a relatively low temperature and having a lower breakdown voltage and leakage current and a higher value of the nonlinear coefficient.

2. Description of the Prior Art

Varistors are resistors with resistance varying in voltage in a nonlinear relation. Varistors have high resistance and are good resistors when loaded with voltage below the critical voltage. The resistance of the varistor abruptly decreases and the electric current through the varistor will greatly increase when voltages are higher than the critical voltage. In other words, varistors possess the ability to absorb surges, reduce overload voltage to a safe level and prevent electric components from being damaged by surges.

As to the electric characteristic of varistors, the value of voltage (V) selected to give a 1 mA current through the varistor is called the breakdown voltage ($V_B$). The leakage current ($I_L$) means the electric current at the voltage of 0.8 $V_B$. The breakdown characteristics of varistors are very important in application. The relationship between voltage and electric current is expressed by the equation of $$I = k V^\alpha$$

wherein I represents the electric current through the varistor, k is a constant, V represents the voltage applied across the varistor, and α is a nonlinear coefficient. Based on the above simple equation, the a value of the nonlinear coefficient can be determined by the values of the voltage and the electrical current.

The technique of producing zinc oxide varistor has been in development for several years. $Bi_2O_3$ has been used as an elementary additive up to now. When ZnO and $Bi_2O_3$ powders are sintered, $Bi_2O_3$ will segregate at the ZnO boundaries as an intergranular phase and form an electronic conduction barrier between ZnO grains, so that the ZnO ceramics exhibit nonohmic behavior. Several other oxides are added into general commercial varistor products to enhance the nonohmic effect, such as to improve intergranular barriers and microstructure. The zinc oxide varistors produced by conventional methods of bulk ceramics have excellent nonlinear voltage (V)—current (I) characteristics. That is, based on the above equation of $I = k V^\alpha$, the nonlinear coefficient α is more than 50. The varistors are widely applied since the electrical stability and the ability to absorb surges are good.

Recently, electrical appliances gradually have become smaller and integrated circuits are frequently used. General bulk varistor cannot be directly applied because of high working voltages. In order to protect the integrated circuit elements from being damaged by surges, varistors with low working voltages are necessary, the multilayer chip varistors with low working voltages are particularly important. The advantages of the multilayer technique for producing varistors are for instance: (1) the volume of varistors is reduced for subsequent surface mount technology; and (2) the breakdown voltage ranges from several voltages to dozens of voltages simply by controlling the thickness of the ceramic layer. In addition, the design of the multilayer can achieve the purpose of increasing electrode area. As compared with other methods of producing low voltage varistor, such as thin foil method, thick film method, and seed grain method, multilayer method can produce in a large scale, have good reproducibility and higher surge absorption per volume.

Traditional ZnO—$Bi_2O_3$ system varistors are obtained by sintering at a temperature above 1100° C. The internal electrodes within the multilayer varistor should be the expensive palladium (Pd) or platinum (Pt) material due to their high melting point. However, it is noted that when the ZnO—$Bi_2O_3$ system and the palladium internal electrode are sintered at high temperatures, $Bi_2O_3$ and the palladium internal electrode produce a solid solution reaction and result in damage. In U.S. Pat. No. 4,290,041, Utsumi et al. uses borosilicate-lead-zinc (i.e. Pb—B—Zn—Si) glass as the principal additive to replace the original $Bi_2O_3$ additive. But a high sintering temperature, for instance more than 1100° C. is still necessary in Utsumi's method. Therefore, it is inevitable to use the expensive palladium or platinum material as internal electrodes which will keep the manufacturing cost high.

Based on the above description, the principal additives used in commercial varistors are classified into three series: bismuth based additives ($Bi_2O_3$), praseodymium based additives ($Pr_6O_{11}$) and borosilicate-lead-zinc (Pb—B—Zn—Si) glass. In order to solve the problems of the above mentioned three series, the present invention provides a vanadium based additive ($V_2O_5$) used in ZnO varistors. The varistors of the present invention not only can be sintered at a lower temperature of 900° C. due to the addition of $V_2O_5$, but also have excellent nonlinear current-voltage characteristics by the incorporation of several metal oxides. Sintering at a relatively low temperature is important for applications because the ZnO—$V_2O_5$ system can be cofired with a silver inner-electrode (m.p. 961° C.) rather than using the expensive palladium or platinum material.

SUMMARY OF THE INVENTION

One objective of the invention is to provide a zinc oxide varistor comprising vanadium oxide as a principal additive and cobalt oxide(s) and/or manganese oxide(s) so as to be sintered at a relatively low temperature and to improve its nonlinear current-voltage characteristics.

Another objective of the invention is to provide a zinc oxide varistor capable of being sintered at a temperature ranging from 900° C. to 950° C. comprising vanadium oxide as a principal additive; and one or more cobalt oxides and/or manganese oxides; a high-valence metal oxide such as $Nb_2O_5$, $Ta_2O_5$, $MoO_3$, and $WO_3$; one or more large ionic radius metal oxides such as $Bi_2O_3$, $SrCO_3$, $BaCO_3$, $La_2O_3$, $Y_2O_3$, and $Pr_6O_{11}$, and PbO—$B_2O_3$—$SiO_2$ glass (e.g. borosilicate-lead glass); and/or a low-valence metal oxide such as $Li_2CO_3$, $Na_2CO_3$, and NiO so as to improve the nonohmic behavior and the leakage current of the varistor.

A further objective of the invention is to provide a multilayer chip zinc oxide varistor comprising ZnO as a main ingredient, vanadium oxide as a principal additive, one or more cobalt oxides and/or manganese oxides, and other metal oxides such as high-valence metal oxide, large ionic radius metal oxide, and low-valence metal oxide, of which the manufacturing cost is reduced because silver (Ag) or palladium silver (Pd/Ag) internal electrode can be used.

These and other objectives, advantages and features of the present invention will be understood more fully and appreciated by reference to the written specification.

DETAILED DESCRIPTION OF THE INVENTION

The zinc oxide (ZnO) varistor of the present invention comprises ZnO as a main ingredient, vanadium oxide, such as vanadium pentoxide ($V_2O_5$) as a principal additive, and one or more cobalt oxides and/or manganese oxides. Moreover, other metal oxides are also used as additives in the present invention to improve nonlinear current (I)—voltage (V) characteristics of the varistor. The varistor is capable of being sintered at a relatively low temperature, for instance, at a temperature of about 900° C. to 950° C.

The varistor comprises zinc oxide as a main ingredient, $V_2O_5$ as a "varsistor-forming" ingredient, and other additives used for the improvement of nonohmic properties, including $Mn_3O_4$, $Co_3O_4$, $Li_2CO_3$, $Na_2CO_3$, NiO, $SrCO_3$, $BaCO_3$, $La_2O_3$, $Y_2O_3$, $Bi_2O_3$, $Pr_6O_{11}$, $Nb_2O_5$, $Ta_2O_5$, $MoO_3$, $WO_3$, and/or an additional constituent of glass comprising a $PbO$—$B_2O_3$—$SiO_2$ system. In particular, a zinc oxide varistor of the present invention is capable of being sintered at a temperature of 900° C. to 950° C. and comprises vanadium oxide, such as $V_2O_5$, as the principal additive; one or more cobalt oxides selected from the group consisting of $Co_3O_4$, CoO, and $Co_2O_3$, and/or manganese oxides selected from the group consisting of $Mn_3O_4$, MnO, $MnO_2$, $Mn_2O_3$, and $MnCO_3$; a high-valence metal oxide such as $Nb_2O_5$, $Ta_2O_5$, $MoO_3$, and $WO_3$; one or more large ionic radius metal oxides such as $Bi_2O_3$, $SrCO_3$, $BaCO_3$, $La_2O_3$, $Y_2O_3$, and $Pr_6O_{11}$, and $PbO$—$B_2O_3$—$SiO_2$ glass (e.g. borosilicate-lead glass); and/or a low-valence metal oxide such as $Li_2CO_3$, $Na_2CO_3$, and NiO.

Zinc Oxide having $V_2O_5$ as the only additive exhibits nonohomic behavior similar to that of ZnO—$Bi_2O_3$ ceramics. More importantly, ZnO—$V_2O_5$ ceramic systems can be sintered at a relatively low temperature, i.e. about 900° C., with the aid of $V_2O_5$ liquid phase. In the present invention, the varistor property of ZnO—$V_2O_5$ ceramics can be significantly improved by doping one or more cobalt oxides and/or manganese oxides so that the nonlinear coefficient, $\alpha$, of the ZnO varistors is increased to more than 20. Before doping, the nonlinear coefficient, $\alpha$, is about 4.

After adding vanadium oxide such as $V_2O_5$ to ZnO, the vanadium oxide such as $V_2O_5$ forms a vanadium-rich intergranular phase between ZnO grains at a high temperature and promotes ZnO grain growth. Moreover, vanadium oxide such as $V_2O_5$ will segregate at the grain boundary during cooling so as to form a continuous intergranular layer which is an electronic barrier. The nonlinear current-voltage characteristics of ZnO—$V_2O_5$ varistors are fundamentally attributed to the nature of the grain boundary barrier layer between the relatively conductive ZnO grains. In the present invention, vanadium oxide, such as $V_2O_5$, in the range of 0.1–2 mol % is added to ZnO. When the amount of $V_2O_5$ is lower than 0.1 mol %, such a minor amount cannot have a liquid phase effect at a sintering temperature of 900° C. but inhibits the densification of ZnO powers. When the amount of $V_2O_5$ is more than 2 mol %, an excess of grain boundary phase appears between ZnO grains and therefore results in poor varistor properties.

The doping of one or more cobalt oxides and/or manganese oxides will greatly improve the varistor properties of ZnO—$V_2O_5$ ceramics. The suitable cobalt oxides in the present invention are $Co_3O_4$, CoO, $Co_2O_3$, and similar oxide compounds, and manganese oxides are $Mn_3O_4$, MnO, $MnO_2$, $Mn_2O_3$, $MnCO_3$, and similar oxide compounds. The doping amount of one or more cobalt oxides and/or manganese oxides can not exceed 0.65 mol %. However, when only one cobalt oxide or manganese oxide is used, its amount is in the range of 0.05–0.5 mol %. Take $Mn_3O_4$ or $Co_3O_4$ as a example, the nonlinear coefficient of the ZnO—$V_2O_5$ varistors is apparently enhanced when 0.05–0.5 mol % $Mn_3O_4$ or 0.05–0.5 mol % $Co_3O_4$ is added during the manufacture of ZnO—$V_2O_5$ ceramics. Our tests reveal when $Mn_3O_4$ and $Co_3O_4$ are added simultaneously, although the nonlinear coefficient of the ceramic specimen is impossible to be further enhanced, the leakage current of ZnO—$V_2O_5$ ceramics can be lowered. When more than one cobalt oxides and/or manganese oxides are used, the amount is in the range of 0.05–0.65 mol %.

The reason that the addition of $Mn_3O_4$ and/or $Co_3O_4$ can improve the varistor behavior of ZnO—$V_2O_5$ ceramics is $Mn_3O_4$ and/or $Co_3O_4$ will form specific deep levels in the intergranular region, which are beneficial to producing a sharp grain boundary energy barrier. However, when the addition amount of $Mn_3O_4$ and/or $CO_3O_4$ is more than 0.5 mol % or lower than 0.05 mol %, the improvement of varistor properties of ZnO—$V_2O_5$ ceramics will not be obvious.

In addition to the above additives, further oxide additives including high-valence metal oxides such as $Nb_2O_5$, $Ta_2O_5$, $MoO_3$, and $WO_3$; large ionic radius metal oxides such as $Bi_2O_3$, $SrCO_3$, $BaCO_3$, $La_2O_3$, $Y_2O_3$, and $Pr_6O_{11}$, and $PbO$—$B_2O_3$—$SiO_2$ glass (e.g. borosilicate-lead glass); and/or low-valence metal oxides such as $Li_2CO_3$, $Na_2CO_3$, and NiO, are also added in the present invention. The nonlinear current-voltage characteristics and the leakage current of the varistors in accordance with the present invention are superior because of the addition of these oxides.

The addition of a high-valence metal oxide such as $Nb_2O_5$, $Ta_2O_5$, $MoO_3$, and $WO_3$, will enhance the varistor property and the leakage current of the zinc oxide varistor comprising vanadium oxide as a principal additive, and one or more cobalt oxides and/or manganese oxides. The addition amount of high-valence metal oxides such as $Nb_2O_5$, $Ta_2O_5$, $MoO_3$ and $WO_3$ should be limited to the range of 0.005–0.1 mol %. Once an excessive amount is used, the high-valence metal oxide will destroy the original varistor property of ceramics. Moreover, if two or more high-valence metal oxides are doped, they will not improve the varistor property. This means the addition of high-valence metal oxides does not have a synergetic effect.

In regards to large ionic radius metal oxides such as oxides of Bi ($Bi_2O_3$), Sr ($SrCO_3$), Ba ($BaCO_3$), La ($La_2O_3$), Y($Y_2O_3$) and Pr ($Pr_6O_{11}$), it is also useful to improve the nonlinear current-voltage characteristics of ZnO—$V_2O_5$—$Mn_3O_4$—$Co_3O_4$ ceramics. It is noted that the large ionic radius metal oxide easily resides at the ZnO grain boundaries so that the addition of the appropriate amount is necessary. Except that $Bi_2O_3$ is added in an amount of 0.005–0.05 mol %, other large ionic radius metal oxide such as $SrCO_3$, $BaCO_3$, $La_2O_3$, $Y_2O_3$, and $Pr_6O_{11}$ is used in an amount of 0.01–0.1 mol %. Moreover, $PbO$—$B_2O_3$—$SiO_2$ glass (e.g. borosilicate-lead glass) comprising 35–70 wt % PbO, 5–25 wt % $B_2O_3$, and 20–50 wt % $SiO_2$ is also used as an additive in the amount of 0.1–2 wt % in the invention.

After testing, one embodiment is found when the ZnO varistors comprising ZnO as a main ingredient, $V_2O_5$ and $Mn_3O_4$ and/or $Co_3O_4$ as principal additives; a high-valence metal oxide selected from the group consisting of $Nb_2O_5$, $Ta_2O_5$, $MoO_3$, and $WO_3$; one or more large ionic radius metal oxides selected from the group consisting of $Bi_2O_3$, $SrCO_3$, $BaCO_3$, $La_2O_3$, $Y_2O_3$, and $Pr_6O_{11}$, and $PbO$—$B_2O_3$—$SiO_2$ glass (e.g. borosilicate-lead glass) possess a better nonlinear coefficient and leakage current than that of the above combinations.

The intergranular conductive energy barrier resulting from the varistor effect is caused by uneven space distribution of impurity. The above additives can improve the varistor behavior of $ZnO$—$V_2O_5$ ceramics because they are somewhat positively beneficial to ZnO grains, the grain boundary phases, or the intergranular conduction barrier. Therefore, the present invention further utilizes a low-valence metal oxide such as oxides of Li ($Li_2CO_3$), Na ($Na_2CO_3$) and Ni (NiO) to improve the varistor property of $ZnO$—$V_2O_5$ ceramics, wherein the amount of $Li_2CO_3$ or $Na_2CO_3$ is controlled in the range of 0.005–0.05 mol % and that of NiO of 0.05–0.5 mol %. After the addition of low-valence metal oxide, the nonlinear coefficient is more than 50 and the leakage current is below 20 $\mu A/cm^2$.

The process for making multilayer chip varistors comprising weighing ceramic powders to form a slurry, tape casting green sheet, printing internal electrodes, laminating, cutting, sintering and applying external electrodes. According to the low-firing capability of the present invention, the cheap pure silver (Ag) or low palladium (Pd) containing Pd/Ag alloy is used as internal electrodes within the above zinc oxide ceramic varistor with oxide additives to fabricate good low-voltage multilayer chip varistors. It is noted that the manufacture cost is significantly reduced.

In accordance with the present invention, the multilayer chip zinc oxide varistors comprising ZnO as a main ingredient, vanadium oxide ($V_2O_5$) as a principal additive, one or more Mn oxide ($Mn_3O_4$) and/or Co oxide ($Co_3O_4$), and other metal oxides such as high-valence metal oxide, large ionic radius metal oxide, and low-valence metal oxide with a different ceramic layer thickness are sintered at 900° C. for 90 minutes while Ag is used as internal electrodes, and at 900° C.–950° C. for 1–2 hours while Pd/Ag alloy is used. The minimum breakdown voltage ($V_B$) is reduced to 4.3 V and the nonlinear coefficient is 18.

The following examples are offered as way of illustration. The examples are not intended to limit the scope of the invention in any respect and should not be construed as such.

EXAMPLES

Example 1

ZnO and $V_2O_5$ powders were used to fabricate ceramic specimens by conventional methods. The $V_2O_5$ powders in a range of 0.1 to 2 mol % were mixed with balanced ZnO powders. The mixture was calcined at 700° C. for 3 hours. The agglomerate was pulverized by ball milling, mixed with binder and then pressed into round specimens, 13 mm in diameter. The sintering condition was at a temperature of 900° C. for 2 hours. The as-sintered specimens were polished on both sides and then Ag was used to form an ohmic contact on the ceramic specimens as electrodes. The electric characteristics of the specimens were tested. Based on the nonlinear voltage (V)—current (I) characteristics, 10 $mA/cm^2$ or 1–10 $mA/cm^2$ was used to determine the value of nonlinear coefficient.

It was noted that the addition of the $V_2O_5$ additive changed the ZnO densification behavior drastically. The average grain size of $ZnO$—$V_2O_5$ ceramic specimens were apparently higher than that of pure ZnO. The pure ZnO specimens had the nonlinear coefficient of 1 and their voltage (V)—current (I) relation is linearly ohmic. However, $ZnO$—$V_2O_5$ ceramic specimens exhibited varistor property and had a nonlinear coefficient in the range of 1.8–5 under an electrical current density of 10 $mA/cm^2$. The influence of the $V_2O_5$ additive on the ZnO varistor properties was shown in the following Table 1.

TABLE 1

The influence of V2O5 additive on ZnO varistor properties

| Specimen No. | ZnO (mol %) | $V_2O_5$ (mol %) | Sintering conditions | Density (g/cm³) | Average grain size (μm) | α (at 10 mA/cm²) |
|---|---|---|---|---|---|---|
| 1 | 100 | — | 900° C.-2 h | 5.45 | 3.1 | 1 |
| 2 | Balance | 0.1 | " | 5.51 | 5.6 | 5 |
| 3 | " | 0.25 | " | 5.49 | 6.6 | 4.6 |
| 4 | " | 0.5 | " | 5.44 | 7.7 | 4.2 |
| 5 | " | 1 | " | 5.35 | 8.9 | 1.9 |
| 6 | " | 2 | " | 5.17 | 7.5 | 1.8 |

Example 2

The composition of $ZnO$—$V_2O_5$ ceramic specimens listed in Table 2, wherein ZnO was the main ingredient, the addition amount of $V_2O_5$ was 0.5 mol %, and that of $Mn_3O_4$ and/or $Co_3O_4$ additives were 0.05, 0.1, 0.15, 0.3 and 0.5 mol %, respectively. The fabricating steps and sintering conditions, i.e. 900° C. for 2 hours of Example 1, were repeated. In addition, the total amount of $Mn_3O_4$ and $Co_3O_4$ both additives were in the range of 0.05–0.65 mol %, as shown in specimen nos. 17–21 and 22–26, wherein the amount of one additive was fixed and that of the other was increased subsequently. After the fabrication, the nonlinear coefficient, breakdown voltage, and leakage current were also listed in Table 2. As compared with the results of Example 1, it was noted that the nonlinear coefficient is apparently increased.

TABLE 2

The influence of Mn3O4 and/or Co3O4 additives on ZnO—V2O5 varistor properties

| Specimen No. | ZnO (mol %) | $V_2O_5$ (mol %) | $Mn_3O_4$ (mol %) | $Co_3O_4$ (mol %) | α (at 10 mA/cm²) | $V_B$ (V/mm) | $I_L$ (mA/cm²) |
|---|---|---|---|---|---|---|---|
| 7 | Balance | 0.5 | 0.05 | — | 25 | 239 | 0.081 |
| 8 | " | " | 0.1 | — | 43 | 535 | 0.219 |
| 9 | " | " | 0.15 | — | 40 | 363 | 0.230 |
| 10 | " | " | 0.3 | — | 22 | 216 | 0.404 |
| 11 | " | " | 0.5 | — | 34 | 291 | 0.643 |
| 12 | " | " | — | 0.05 | 17 | 152 | 0.552 |
| 13 | " | " | — | 0.1 | 18 | 175 | 0.507 |
| 14 | " | " | — | 0.15 | 20 | 177 | 0.503 |
| 15 | " | " | — | 0.3 | 7 | 64 | 0.654 |

TABLE 2-continued

The influence of Mn3O4 and/or Co3O4 additives on ZnO—V2O5 varistor properties

| Specimen No. | ZnO (mol %) | $V_2O_5$ (mol %) | $Mn_3O_4$ (mol %) | $Co_3O_4$ (mol %) | α (at 10 mA/cm²) | $V_B$ (V/mm) | $I_L$ (mA/cm²) |
|---|---|---|---|---|---|---|---|
| 16 | " | " | — | 0.5 | 10 | 134 | 0.674 |
| 17 | " | " | 0.15 | 0.05 | 32 | 229 | 0.172 |
| 18 | " | " | " | 0.1 | 33 | 197 | 0.166 |
| 19 | " | " | " | 0.15 | 32 | 216 | 0.230 |
| 20 | " | " | " | 0.3 | 25 | 277 | 0.510 |
| 21 | " | " | " | 0.5 | 23 | 253 | 0.502 |
| 22 | " | " | 0.05 | 0.15 | 16 | 115 | 0.519 |
| 23 | " | " | 0.1 | " | 20 | 145 | 0.539 |
| 24 | " | " | 0.15 | " | 32 | 216 | 0.230 |
| 25 | " | " | 0.3 | " | 23 | 170 | 0.561 |
| 26 | " | " | 0.5 | " | 24 | 223 | 0.477 |

Example 3

The composition of ZnO—$V_2O_5$ ceramic specimens listed in Table 3, wherein ZnO was the main ingredient, and the addition amount of $V_2O_5$, $Mn_3O_4$ and $Co_3O_4$ additives were 0.5, 0.1 and 0.2 mol %, respectively. The fabricating steps and sintering conditions, i.e. 900° C. for 2 hours of Example 1, were repeated.

Specimen no. 27 was the zinc oxide varistor only containing these three additives. From specimen no. 28, a high-valence metal oxide such as $Nb_2O_5$, $Ta_2O_5$, $MoO_3$, and $WO_3$ was added in an amount of 0.005, 0.01, 0.03, 0.05, and 0.1 mol %, respectively. After the fabrication and test, the nonlinear coefficient, breakdown voltage, and leakage current were also listed in Table 3.

When comparing the results of Tables 2 and 3, it was found that the addition of a high-valence metal oxide resulted in the reduction of leakage current, wherein the unit of leakage current ($I_L$) in Table 3 was μA/cm² and in Table 2 was mA/cm². Particularly, when comparing with specimen no. 27, the addition of a high-valence metal oxide was helpful to improve the nonlinear coefficient.

Example 4

The composition of ZnO—$V_2O_5$ ceramic specimens were listed in Table 5-1, wherein ZnO was the main ingredient, and the addition amount of $V_2O_5$, $Mn_3O_4$ and $Co_3O_4$ additives were 0.5, 0.1 and 0.2 mol %, respectively. The fabricating steps and sintering conditions, i.e. 900° C. for 2 hours of Example 1, were repeated.

A large ionic radius metal oxide such as $SrCO_3$, $BaCO_3$, $La_2O_3$, $Y_2O_3$, and $Pr_6O_{11}$ was added in an amount of 0.01, 0.03, 0.05, and 0.1 mol %, respectively. $Bi_2O_3$ was added in a less amount, such as 0.005, 0.01, 0.03, and 0.05 mol %. After the fabrication and test, the nonlinear coefficient, breakdown voltage, and leakage current were also listed in specimen nos. 48–71, Table 5-1.

The addition of PbO—$B_2O_3$—$SiO_2$ glass (i.e. borosilicate-lead glass) to ZnO—$V_2O_5$—$Mn_3O_4$—$Co_3O_4$ varistor was also discussed in this example and the resulting varistor properties were listed in Table 5-2. Three kinds of PbO—$B_2O_3$—$SiO_2$ glass, namely A, B, and C types, were exemplified, wherein A type was individually doped in an amount of 0.1, 0.5, and 1 wt %, and B and C types were

TABLE 3

The influence of high-valence metal oxide additive on ZnO—V2O5—Mn3O4—Co3O4 varistor properties

| Specimen No. | ZnO (mol %) | $V_2O_5$ (mol %) | $Mn_3O_4$ (mol %) | $Co_3O_4$ (mol %) | $Nb_2O_5$ (mol %) | $Ta_2O_5$ (mol %) | $MoO_3$ (mol %) | $WO_3$ (mol %) | $V_B$ (V/mm) | $I_L$ (μA/cm²) | α (1–10 mA/cm²) |
|---|---|---|---|---|---|---|---|---|---|---|---|
| 27 | Balance | 0.5 | 0.1 | 0.2 | — | — | — | — | 88 | 312 | 21 |
| 28 | " | " | " | " | 0.005 | — | — | — | 100 | 84 | 28 |
| 29 | " | " | " | " | 0.01 | — | — | — | 103 | 56 | 24 |
| 30 | " | " | " | " | 0.03 | — | — | — | 180 | 53 | 24 |
| 31 | " | " | " | " | 0.05 | — | — | — | 276 | 140 | 29 |
| 32 | " | " | " | " | 0.1 | — | — | — | 277 | 170 | 27 |
| 33 | " | " | " | " | — | 0.005 | — | — | 137 | 82 | 32 |
| 34 | " | " | " | " | — | 0.01 | — | — | 241 | 193 | 29 |
| 35 | " | " | " | " | — | 0.03 | — | — | 245 | 217 | 18 |
| 36 | " | " | " | " | — | 0.05 | — | — | 250 | 279 | 15 |
| 37 | " | " | " | " | — | 0.1 | — | — | 303 | 331 | 9 |
| 38 | " | " | " | " | — | — | 0.005 | — | 165 | 105 | 22 |
| 39 | " | " | " | " | — | — | 0.01 | — | 202 | 65 | 25 |
| 40 | " | " | " | " | — | — | 0.03 | — | 211 | 61 | 28 |
| 41 | " | " | " | " | — | — | 0.05 | — | 228 | 57 | 26 |
| 42 | " | " | " | " | — | — | 0.1 | — | 207 | 96 | 23 |
| 43 | " | " | " | " | — | — | — | 0.005 | 92 | 102 | 28 |
| 44 | " | " | " | " | — | — | — | 0.01 | 96 | 67 | 33 |
| 45 | " | " | " | " | — | — | — | 0.03 | 117 | 67 | 34 |
| 46 | " | " | " | " | — | — | — | 0.05 | 108 | 61 | 29 |
| 47 | " | " | " | " | — | — | — | 0.1 | 112 | 88 | 28 | respectively doped in 1 wt%. It was noted that although $Bi_2O_3$ was added in a less amount, the resulting leakage current was the lowest.

TABLE 4

The components of PbO—B2O3—SiO2 glass

| Glass type | PbO (wt %) | $B_2O_3$ (wt %) | $SiO_2$ (wt %) |
|---|---|---|---|
| A | 70 | 10 | 20 |
| B | 45 | 5 | 50 |
| C | 35 | 25 | 40 |

The composition of specimen nos. 78–81 in Table 6-1 comprised 0.01 mol % of large ionic radius metal oxide $Bi_2O_3$ and 0.01 mol % of one kind of high-valence metal oxide such as $Nb_2O_5$, $Ta_2O_5$, $MoO_3$, and $WO_3$. The influence of these additives on $ZnO$—$V_2O_5$—$Mn_3O_4$—$Co_3O_4$ varistor properties was shown in Table 6-1.

The composition of specimen nos. 82–86 in Table 6-2 comprised 0.01 mol % of high-valence metal oxide $Nb_2O_5$ and 0.01 mol % of large ionic radius metal oxide such as $SrCO_3$, $BaCO_3$, $La_2O_3$, $Y_2O_3$ and $Pr_6O_{11}$. The influence of these additives on $ZnO$—$V_2O_5$—$Mn_3O_4$—$Co_3O_4$ varistor properties was shown in Table 6-2.

The composition of specimen nos. 87–92 in Table 6-3 comprised 0.01 mol % of high-valence metal oxide $Nb_2O_5$

TABLE 5-1

The influence of large ionic radius metal oxide on ZnO—V2O5—Mn3O4—Co3O4 varistor properties

| Specimen No. | ZnO (mol %) | $V_2O_5$ (mol %) | $Mn_3O_4$ (mol %) | $Co_3O_4$ (mol %) | $SrCO_3$ (mol %) | $BaCO_3$ (mol %) | $La_2O_3$ (mol %) | $Y_2O_3$ (mol %) | $Bi_2O_3$ (mol %) | $V_B$ (V/mm) | $I_L$ ($\mu A/cm^2$) | $\alpha$ (1–10 $mA/cm^2$) |
|---|---|---|---|---|---|---|---|---|---|---|---|---|
| 48 | Balance | 0.5 | 0.1 | 0.2 | 0.01 | — | — | — | — | 90 | 235 | 22 |
| 49 | " | " | " | " | 0.03 | — | — | — | — | 92 | 188 | 25 |
| 50 | " | " | " | " | 0.05 | — | — | — | — | 139 | 107 | 28 |
| 51 | " | " | " | " | 0.1 | — | — | — | — | 208 | 335 | 18 |
| 52 | " | " | " | " | — | 0.01 | — | — | — | 91 | 268 | 23 |
| 53 | " | " | " | " | — | 0.03 | — | — | — | 98 | 226 | 24 |
| 54 | " | " | " | " | — | 0.05 | — | — | — | 125 | 194 | 29 |
| 55 | " | " | " | " | — | 0.1 | — | — | — | 171 | 284 | 24 |
| 56 | " | " | " | " | — | — | 0.01 | — | — | 113 | 269 | 25 |
| 57 | " | " | " | " | — | — | 0.03 | — | — | 118 | 254 | 27 |
| 58 | " | " | " | " | — | — | 0.05 | — | — | 104 | 241 | 27 |
| 59 | " | " | " | " | — | — | 0.1 | — | — | 81 | 93 | 26 |
| 60 | " | " | " | " | — | — | — | 0.01 | — | 96 | 230 | 26 |
| 61 | " | " | " | " | — | — | — | 0.03 | — | 92 | 271 | 27 |
| 62 | " | " | " | " | — | — | — | 0.05 | — | 83 | 311 | 23 |
| 63 | " | " | " | " | — | — | — | 0.1 | — | 82 | 332 | 20 |
| 64 | " | " | " | " | — | — | — | — | 0.005 | 102 | 34 | 30 |
| 65 | " | " | " | " | — | — | — | — | 0.01 | 112 | 29 | 33 |
| 66 | " | " | " | " | — | — | — | — | 0.03 | 144 | 34 | 33 |
| 67 | " | " | " | " | — | — | — | — | 0.05 | 157 | 35 | 32 |

TABLE 5-2

The influence of PbO—B2O3—SiO2 glass on ZnO—V2O5—Mn3O4—Co3O4 varistor properties

| Specimen No. | ZnO (mol %) | $V_2O_5$ (mol %) | $Mn_3O_4$ (mol %) | $Co_3O_4$ (mol %) | $Pr_6O_{11}$ (mol %) | A type glass (wt %) | B type glass (wt %) | C type glass (wt %) | $V_B$ (V/mm) | $I_L$ ($\mu A/cm^2$) | $\alpha$ 1–10 $mA/cm^2$ |
|---|---|---|---|---|---|---|---|---|---|---|---|
| 68 | Balance | 0.5 | 0.1 | 0.2 | 0.01 | — | — | — | 116 | 80 | 28 |
| 69 | " | " | " | " | 0.03 | — | — | — | 85 | 215 | 26 |
| 70 | " | " | " | " | 0.05 | — | — | — | 100 | 204 | 22 |
| 71 | " | " | " | " | 0.1 | — | — | — | 135 | 239 | 20 |
| 72 | " | " | " | " | — | 0.1 | — | — | 312 | 259 | 26 |
| 73 | " | " | " | " | — | 0.5 | — | — | 434 | 156 | 30 |
| 74 | " | " | " | " | — | 1 | — | — | 468 | 92 | 33 |
| 75 | " | " | " | " | — | 2 | — | — | 871 | 358 | 35 |
| 76 | " | " | " | " | — | — | 1 | — | 457 | 81 | 35 |
| 77 | " | " | " | " | — | — | — | 1 | 421 | 102 | 30 |

Example 5

In this example, the zinc oxide varistor contained ZnO as the main ingredient, $V_2O_5$, $Mn_3O_4$ and $Co_3O_4$ additives respectively added in an amount of 0.5, 0.15 and 0.15 mol %, and one high-valence metal oxide such as $Nb_2O_5$, $Ta_2O_5$, $MoO_3$, and $WO_3$ in Example 3, and one or more large ionic radius metal oxide such as $Bi_2O_3$, $SrCO_3$, $BaCO_3$, $La_2O_3$, $Y_2O_3$, $Pr_6O_{11}$, and PbO—$B_2O_3$—$SiO_2$ glass (e.g. borosilicate-lead glass) in Example 4. The fabricating steps and sintering conditions, i.e. 900° C. for 2 hours of Example 1, were repeated.

and 0.8 wt % of A type glass in Example 4, or 0.01 mol % of high-valence metal oxide $Nb_2O_5$ and 0.01 mol % of large ionic radius metal oxide such as $Bi_2O_3$, $BaCO_3$, $Y_2O_3$. The influence of these additives on $ZnO$—$V_2O_5$—$Mn_3O_4$—$Co_3O_4$ varistor properties was shown in Table 6-3.

More notably, from specimen no. 88, the additives included two or more large ionic radius metal oxides and PbO—$B_2O_3$—$SiO_2$ glass. While being compared with the resulting varistor properties of Example 3 illustrating the addition of only one kind of high-valence metal oxide and Example 4 illustrating the addition of one kind large ionic radius metal oxide, the use of both high-valence metal oxide and one or more of large ionic radius metal oxides showed many superior advantages.

type glass, 0.01 mol % of $Bi_2O_3$, and one or more low-valence metal oxide. The influence of these additives on $ZnO$—$V_2O_5$—$Mn_3O_4$—$Co_3O_4$ varistor properties was

TABLE 6-1

The influence of one large ionic radius metal oxide and one high-valence metal oxide on ZnO—V2O5—Mn3O4—Co3O4 varistor properties

| Specimen No. | ZnO (mol %) | $V_2O_5$ (mol %) | $Mn_3O_4$ (mol %) | $Co_3O_4$ (mol %) | $Bi_2O_3$ (mol %) | $Nb_2O_5$ (mol %) | $Ta_2O_5$ (mol %) | $MoO_3$ (mol %) | $WO_3$ (mol %) | $V_B$ (V/mm) | $I_L$ ($\mu A/cm^2$) | $\alpha$ (1–10 $mA/cm^2$) |
|---|---|---|---|---|---|---|---|---|---|---|---|---|
| 78 | Balance | 0.5 | 0.15 | 0.15 | 0.01 | 0.01 | — | — | — | 238 | 18 | 36 |
| 79 | " | " | " | " | " | — | 0.01 | — | — | 375 | 33 | 29 |
| 80 | " | " | " | " | " | — | — | 0.01 | — | 108 | 25 | 34 |
| 81 | " | " | " | " | " | — | — | — | 0.01 | 116 | 20 | 36 |

TABLE 6-2

The influence of one high-valence metal oxide and one large ionic radius metal oxide on ZnO—V2O5—Mn3O4—Co3O4 varistor properties

| Specimen No. | ZnO (mol %) | $V_2O_5$ (mol %) | $Mn_3O_4$ (mol %) | $Co_3O_4$ (mol %) | $Nb_2O_5$ (mol %) | $SrCO_3$ (mol %) | $BaCO_3$ (mol %) | $La_2O_3$ (mol %) | $Y_2O_3$ (mol %) | $Pr_6O_{11}$ (mol %) | $V_B$ (V/mm) | $I_L$ ($\mu A/cm^2$) | $\alpha$ (1–10 $mA/cm^2$) |
|---|---|---|---|---|---|---|---|---|---|---|---|---|---|
| 82 | Balance | 0.5 | 0.15 | 0.15 | 0.01 | 0.01 | — | — | — | — | 338 | 36 | 35 |
| 83 | " | " | " | " | " | — | 0.01 | — | — | — | 354 | 41 | 33 |
| 84 | " | " | " | " | " | — | — | 0.01 | — | — | 305 | 61 | 26 |
| 85 | " | " | " | " | " | — | — | — | 0.01 | — | 328 | 53 | 27 |
| 86 | " | " | " | " | " | — | — | — | — | 0.01 | 315 | 48 | 30 |

TABLE 6-3

The influence of one high-valence metal oxide, PbO—B2O3—SiO2 glass, and large ionic radius metal oxide on ZnO—V2O5—Mn3O4—Co3O4 varistor properties

| Specimen No. | ZnO (mol %) | $V_2O_5$ (mol %) | $Mn_3O_4$ (mol %) | $Co_3O_4$ (mol %) | $Nb_2O_5$ (mol %) | A type glass (wt %) | $Bi_2O_3$ (mol %) | $BaCO_3$ (mol %) | $Y_2O_3$ (mol %) | $V_B$ (V/mm) | $I_L$ ($\mu A/cm^2$) | $\alpha$ (1–10 $mA/cm^2$) |
|---|---|---|---|---|---|---|---|---|---|---|---|---|
| 87 | Balance | 0.5 | 0.15 | 0.15 | 0.01 | 0.8 | — | — | — | 468 | 35 | 48 |
| 88 | " | " | " | " | " | " | 0.01 | — | — | 410 | 11 | 52 |
| 89 | " | " | " | " | " | " | " | 0.01 | — | 436 | 119 | 54 |
| 90 | " | " | " | " | " | " | " | — | 0.01 | 424 | 23 | 49 |
| 91 | " | " | " | " | " | " | — | 0.01 | — | 354 | 25 | 38 |
| 92 | " | " | " | " | " | — | " | — | 0.01 | 316 | 39 | 31 |

Example 6

The composition of $ZnO$—$V_2O_5$—$Mn_3O_4$—$Co_3O_4$ ceramic specimen nos. 93–103 in Table 7 included 0.01 mol % of large ionic radius metal oxide $Nb_2O_5$, 0.8 wt % of A type glass, 0.01 mol % of $Bi_2O_3$, and one or more low-valence metal oxide. The influence of these additives on $ZnO$—$V_2O_5$—$Mn_3O_4$—$Co_3O_4$ varistor properties was shown in Table 7. It was clear that the leakage current of all the fabricated ceramics was below 20 $\mu A/cm^2$ and some of the nonlinear coefficient were more than 50.

TABLE 7

The influence of low-valence metal oxide on ZnO—V2O5—Mn3O4—Co3O4 varistor properties

| Specimen No. | ZnO (mol %) | $V_2O_5$ (mol %) | $Mn_3O_4$ (mol %) | $Co_3O_4$ (mol %) | $Nb_2O_5$ (mol %) | A type glass (wt %) | $BaCO_3$ (mol %) | $Li_2CO_3$ (mol %) | $Na_2CO_3$ (mol %) | NiO (mol %) | $V_B$ (V/mm) | $I_L$ ($\mu A/cm^2$) | $\alpha$ (1–10 $mA/cm^2$) |
|---|---|---|---|---|---|---|---|---|---|---|---|---|---|
| 93 | Balance | 0.5 | 0.15 | 0.15 | 0.01 | 0.8 | 0.01 | 0.005 | — | — | 482 | 12 | 49 |
| 94 | " | " | " | " | " | " | " | 0.01 | — | — | 411 | 7.9 | 51 |
| 95 | " | " | " | " | " | " | " | 0.03 | — | — | 406 | 9.6 | 54 |
| 96 | " | " | " | " | " | " | " | 0.05 | — | — | 431 | 14 | 52 |
| 97 | " | " | " | " | " | " | " | — | 0.005 | — | 481 | 13 | 51 |
| 98 | " | " | " | " | " | " | " | — | 0.01 | — | 406 | 8.7 | 53 |
| 99 | " | " | " | " | " | " | " | — | 0.03 | — | 402 | 11 | 54 |
| 100 | " | " | " | " | " | " | " | — | 0.05 | — | 422 | 18 | 53 |
| 101 | " | " | " | " | " | " | " | — | 0.01 | 0.05 | 409 | 11 | 52 |
| 102 | " | " | " | " | " | " | " | — | " | 0.1 | 397 | 10 | 59 |
| 103 | " | " | " | " | " | " | " | — | " | 0.5 | 416 | 24 | 48 |

Example 7

The manufacture of the multilayer chip varistor was illustrated by using the composition of specimen no. 78 as shown in Table 5-1. The ZnO, $V_2O_5$, $Mn_3O_4$, $Co_3O_4$, $Bi_2O_3$, and $Nb_2O_5$ powders were calcined at 700° C. for 3 hours. The calcined ceramic powders, solvent and dispersant were mixed and ground in a ball mill. The mixture was further mixed with a binder and surfactants and then stirred to form a slurry. The tape casting technique by utilizing doctor-blade was used to produce a ceramic tape. The solvent in the tape was volatilized by heating. The ceramic sheets were printed with internal electrodes, laminated and cut to obtain a green chip specimen. The binder was degraded at a low temperature and then the ceramic specimen was sintered at a high temperature. After a silver electrode was added to both edges of the specimen, the multilayer chip zinc oxide varistor was fabricated.

The multilayer chip varistors were in the dimension of 4 mm×3.2 mm. Two metals in different ceramic layer thickness were separately used as internal electrodes: one is pure silver and the other is Pd/Ag alloy. For silver, eight layers of internal electrodes were contained in specimens and the sintered conditions were 900° C. for 90 minutes. For the Pd/Ag alloy, 12 layers of internal electrodes were contained in specimens and the sintering conditions were 900° C.–950° C. for 1 or 2 hours.

Although the varistor properties of the multilayer chip varistor became generally poorer than those of disc specimens, the breakdown voltage of the former was apparently reduced. The minimum breakdown $V_B$ was determined to be 4.3 V and the nonlinear coefficient was 18. Further detailed results were listed in Table 8.

TABLE 8

The electric characteristics of multilayer chip varistor

| Specimen No. | ZnO (mol %) | $V_2O_5$ (mol %) | $Mn_3O_4$ (mol %) | $Co_3O_4$ (mol %) | $Bi_2O_3$ (mol %) | $Nb_2O_5$ (mol %) | Material of inner electrode | Sintering conditions | Ceramic layer thickness (μm) | $V_B$ (V) | α |
|---|---|---|---|---|---|---|---|---|---|---|---|
| 104 | Balance | 0.5 | 0.15 | 0.15 | 0.01 | 0.01 | Ag | 900° C.-90 min | 39 | 7.8 | 13 |
| 105 | " | " | " | " | " | " | " | " | 49 | 11.4 | 17 |
| 106 | " | " | " | " | " | " | " | " | 59 | 15 | 19 |
| 107 | " | " | " | " | " | " | Pd/Ag | 900° C.-1 h | 19 | 15 | 13 |
| 108 | " | " | " | " | " | " | " | " | 25 | 21 | 14 |
| 109 | " | " | " | " | " | " | " | " | 34 | 25 | 17 |
| 110 | " | " | " | " | " | " | " | 950° C-1 h | 19 | 7.5 | 15 |
| 111 | " | " | " | " | " | " | " | " | 25 | 10 | 16 |
| 112 | " | " | " | " | " | " | " | " | 34 | 14 | 16 |
| 113 | " | " | " | " | " | " | " | 900° C.-2 h | 25 | 11 | 14 |
| 114 | " | " | " | " | " | " | " | 950° C.-2 h | 25 | 4.3 | 18 |

While the invention has been described with respect to certain preferred exemplifications and embodiments, it is not intended to limit the scope of the invention thereby, but solely by the claims appended hereto.

We claim:

1. A bulk-type zinc oxide varistor comprising a ceramic body capable of being sintered at a temperature of 900° C. to 950° C. which comprises zinc oxide as a principal constituent, 0.1–2 mol % of vanadium oxide as a principal additive to form a vanadium rich intergranular phase, and 0.05–0.5 mol % of manganese oxide and 0.05–0.5 mol % of cobalt oxide as auxiliary constituents when calculated in terms of $Mn_3O_4$ and $Co_3O_4$ respectively.

2. The zinc oxide varistor according to claim 1 further comprising 0.005–0.1 mol % of a high-valence metal oxide selected from the group consisting of $Nb_2O_5$, $Ta_2O_5$, $MoO_3$, and $WO_3$.

3. The zinc oxide varistor according to claim 1 further comprising 0.01–0.1 mol % of a large ionic radius metal oxide selected from the group consisting of $SrCO_3$, $BaCO_3$, $La_2O_3$, $Y_2O_3$, $Pr_6O_{11}$, and the mixture thereof.

4. The zinc oxide varistor according to claim 1 further comprising 0.005–0.05 mol % of $Bi_2O_3$.

5. The zinc oxide varistor according to claim 1 further comprising 0.1–2 wt % of PbO—$B_2O_3$—$SiO_2$ glass.

6. The zinc oxide varistor according to claim 5, wherein the PbO—$B_2O_3$—$SiO_2$ glass comprises 35–70 wt % PbO, 5–25 wt % $B_2O_3$, and 20–50 wt % $SiO_2$.

7. The zinc oxide varistor according to claim 1 further comprising 0.005–0.1 mol % of a high-valence metal oxide selected from the group consisting of $Nb_2O_5$, $Ta_2O_5$, $MoO_3$, and $WO_3$, and 0.01–0.1 mol % of one or more large ionic radius metal oxides selected from the group consisting of $SrCO_3$, $BaCO_3$, $La_2O_3$, $Y_2O_3$, $Pr_6O_{11}$, and the mixture thereof.

8. The zinc oxide varistor according to claim 1 further comprising 0.005–0.1 mol % of a high-valence metal oxide selected from the group consisting of $Nb_2O_5$, $Ta_2O_5$, $MoO_3$, and $WO_3$, and 0.005–0.05 mol % of $Bi_2O_3$.

9. The zinc oxide varistor according to claim 1 further comprising 0.005–0.1 mol % of a high-valence metal oxide selected from the group consisting of $Nb_2O_5$, $Ta_2O_5$, $MoO_3$, and $WO_3$, and 0.1–2 wt % of PbO—$B_2O_3$—$SiO_2$ glass.

10. The zinc oxide varistor according to claim 1 further comprising 0.005–0.05 mol % of a low-valence metal oxide selected from the group consisting of $Li_2CO_3$, $Na_2CO_3$, and the mixture thereof.

11. The zinc oxide varistor according to claim 1 further comprising 0.05–0.5 mol % of NiO.

12. The zinc oxide varistor according to claim 7 further comprising 0.005–0.05 mol % of a low-valence metal oxide selected from the group consisting of $Li_2CO_3$, $Na_2CO_3$, and the mixture thereof.

13. The zinc oxide varistor according to claim 12 further comprising 0.05–0.5 mol % of NiO.

14. The zinc oxide varistor according to claim 8 further comprising 0.005–0.05 mol % of a low-valence metal oxide selected from the group consisting of $Li_2CO_3$, $Na_2CO_3$, and the mixture thereof.

15. The zinc oxide varistor according to claim 14 further comprising 0.05–0.5 mol % of NiO.

16. The zinc oxide varistor according to claim 9 further comprising 0.005–0.05 mol % of a low-valence metal oxide selected from the group consisting of $Li_2CO_3$, $Na_2CO_3$, and the mixture thereof.

17. The zinc oxide varistor according to claim 16 further comprising 0.05–0.5 mol % of NiO.

18. A multilayer chip zinc oxide varistor comprising a ceramic body sintered at a temperature of 900° C. to 950° C. which comprises zinc oxide as a principal constituent, 0.1–2 mol % of vanadium oxide as a principal additive, 0.05–0.5 mol % of manganese oxide and 0.05–0.5 mol % of cobalt oxide as auxiliary constituents when calculated in terms of $Mn_3O_4$ and $Co_3O_4$ respectively, and silver (Ag) internal electrode.

19. The multilayer chip zinc oxide varistor according to claim 18, wherein the Ag internal electrode is replaced by palladium/silver (Pd/Ag).

20. The multilayer chip zinc oxide varistor according to claim 18 further comprising 0.005–0.1 mol % of a high-valence metal oxide selected from the group consisting of $Nb_2O_5$, $Ta_2O_5$, $MoO_3$, and $WO_3$.

21. The multilayer chip zinc oxide varistor according to claim 18 further comprising 0.01–0.1 mol % of a large ionic radius metal oxide selected from the group consisting of $SrCO_3$, $BaCO_3$, $La_2O_3$, $Y_2O_3$, $Pr_6O_{11}$, and the mixture thereof.

22. The multilayer chip zinc oxide varistor according to claim 18 further comprising 0.005–0.05 mol % of $Bi_2O_3$.

23. The multilayer chip zinc oxide varistor according to claim 18 further comprising 0.1–2 wt % of $PbO$—$B_2O_3$—$SiO_2$ glass.

24. The multilayer chip zinc oxide varistor according to claim 18 further comprising 0.005–0.1 mol % of a high-valence metal oxide selected from the group consisting of $Nb_2O_5$, $Ta_2O_5$, $MoO_3$, and $WO_3$, and 0.01–0.1 mol % of one or more large ionic radius metal oxides selected from the group consisting of $SrCO_3$, $BaCO_3$, $La_2O_3$, $Y_2O_3$, $Pr_6O_{11}$, and the mixture thereof.

25. The multilayer chip zinc oxide varistor according to claim 18 further comprising 0.005–0.05 mol % of a low-valence metal oxide selected from the group consisting of $Li_2CO_3$, $Na_2CO_3$, and the mixture thereof.

26. The multilayer chip zinc oxide varistor according to claim 18 further comprising 0.05–0.5 mol % of NiO.

27. The multilayer chip zinc oxide varistor according to claim 22 further comprising 0.005–0.05 mol % of a low-valence metal oxide selected from the group consisting of $Li_2CO_3$, $Na_2CO_3$, and the mixture thereof.

28. The multilayer chip zinc oxide varistor according to claim 25 further comprising 0.05–0.5 mol % of NiO.

* * * * *